(12) United States Patent
Nanaumi

(10) Patent No.: US 10,523,630 B2
(45) Date of Patent: Dec. 31, 2019

(54) INFORMATION PROCESSING APPARATUS, STORAGE MEDIUM, AND CONTROL METHOD

(71) Applicant: CANON KABUSHIKI KAISHA, Tokyo (JP)

(72) Inventor: Yoshihito Nanaumi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 292 days.

(21) Appl. No.: 14/076,540

(22) Filed: Nov. 11, 2013

(65) Prior Publication Data

US 2014/0136731 A1    May 15, 2014

(30) Foreign Application Priority Data

Nov. 14, 2012  (JP) ................................. 2012-250180
Dec. 11, 2012  (JP) ................................. 2012-270699

(51) Int. Cl.
*H04L 29/12*      (2006.01)
(52) U.S. Cl.
CPC ................................. *H04L 61/1511* (2013.01)
(58) Field of Classification Search
CPC ............. H04L 61/1511; H04L 61/2092; H04L 41/0246; H04L 41/0273
See application file for complete search history.

(56) References Cited

U.S. PATENT DOCUMENTS

| 7,644,143 | B2 * | 1/2010 | Sakou ............... | H04L 29/12301 |
| | | | | 709/221 |
| 9,037,713 | B2 * | 5/2015 | Larson .............. | H04L 29/12066 |
| | | | | 709/225 |
| 9,038,163 | B2 * | 5/2015 | Larson .............. | H04L 29/12066 |
| | | | | 726/15 |
| 2001/0052007 | A1 * | 12/2001 | Shigezumi ........ | H04L 29/12066 |
| | | | | 709/223 |

FOREIGN PATENT DOCUMENTS

| JP | 11237998 | * | 8/1999 | .......... H04L 61/1511 |
| JP | 11237998 | A | 8/1999 | |
| JP | 2005-033521 | A | 2/2005 | |
| JP | 2005033521 | A | * 2/2005 | |
| JP | 2005033521 | A | * 2/2005 | |

* cited by examiner

*Primary Examiner* — Michael C Lai
(74) *Attorney, Agent, or Firm* — Canon U.S.A., Inc. IP Division

(57) ABSTRACT

An information processing apparatus acquires a second address by inquiring of a Domain Name System server a first address, determines whether the second address coincides with a third address, identifies a communication method when the determination unit determines that the second address coincides with the third address, and communicates with an external information processing apparatus using the identified communication method.

18 Claims, 16 Drawing Sheets

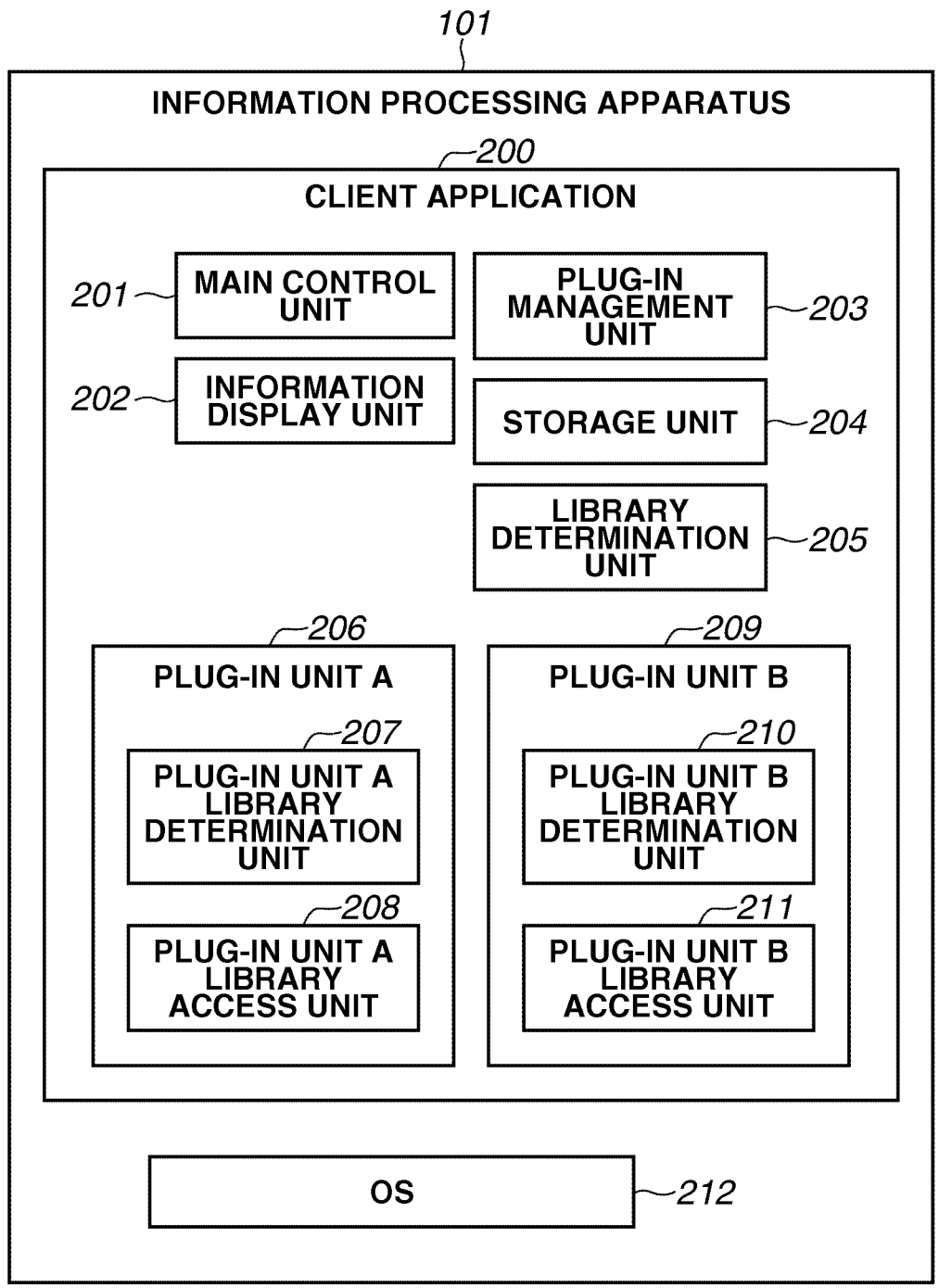

901 SHORTCUT FILE

902 ADDRESS

INFORMATION PROCESSING APPARATUS, STORAGE MEDIUM, AND CONTROL METHOD

BACKGROUND

Field

Aspects of the present invention generally relate to a technique for communicating with an external apparatus.

Description of the Related Art

Content management systems using Internet technologies have been widely used. A user of a content management system can operate from a client via the Internet a content on a Web page set up by a server. The client accesses resources of the server by specifying an address.

Japanese Patent Application Laid-Open No. 11-237998 discusses a technique for comparing a registered address with a local address, and changing processing depending on whether the two addresses coincide with each other. Japanese Patent Application Laid-Open No. 11-237998 further discusses an address notation based on an Internet protocol (IP) address, as illustrated in FIG. 5.

Assuming that there is an environment in which the user can identify a method of communication between an information processing apparatus and an external information processing apparatus based on the registered address.

There is a plurality of address notation formats, for example, an IP-address-based address notation and a name-based address notation (a domain name and a host name). Therefore, in some cases, it is not possible to determine, by simple character string comparison, whether a registered address and an input address indicate an identical location. In such a case, the user may not identify a communication method in the environment assumed above.

SUMMARY

Aspects of the present invention are generally directed to an information processing apparatus enabling a user to identify a communication method more easily.

According to an aspect of the preset invention, an information processing apparatus includes an acquisition unit configured to acquire a second address by inquiring of a Domain Name System server a first address, a determination unit configured to determine whether the second address coincides with a third address, and a communication unit configured to identify a communication method when the determination unit determines that the second address coincides with the third address, and to communicate with an external information processing apparatus using the identified communication method.

Further features of the present disclosure will become apparent from the following description of exemplary embodiments with reference to the attached drawings.

BRIEF DESCRIPTION OF THE DRAWINGS

FIG. 2 illustrates an example of a software configuration of an information processing apparatus.

DESCRIPTION OF THE EMBODIMENTS

Various exemplary embodiments will be described in detail below with reference to the drawings.

In the present specification, information for identifying a location of a file and a folder, such as a Uniform Resource Locator (URL) and a file path, is collectively referred to as an address. Specifically, an address refers not only to a file path on an information processing apparatus 101 (described below) but also to information (including a URL) for identifying a location of a file or a folder on an external information processing apparatus with which the information processing apparatus 101 is able to communicate via a network. Folders on the information processing apparatus 101 and folders on the external information processing apparatus with which the information processing apparatus 101 is able to communicate via a network are referred to as a library.

The present specification, as an example, assumes an application having a plug-in structure. With plug-in modules appended to the information processing apparatus 101, the application is capable of communicating with various document management servers. The present specification also assumes that a communication method differs in each plug-in module.

In the present specification, a communication method refers to a method for the information processing apparatus 101 exchanging files and data with an external information processing apparatus.

Such an application attempts to access a document management server by using an address that can uniquely identify a server resource. The present specification assumes a case where a server provides different communication methods, such as Web-based Distributed Authoring and Versioning (WebDAV), Representational State Transfer (REST), and Simple Object Access Protocol (SOAP), even for an identical address (for example, "http://xxx/yyy/zzz").

A first exemplary embodiment will be described below.

[System Configuration and Hardware Configuration]

Figure 1A:
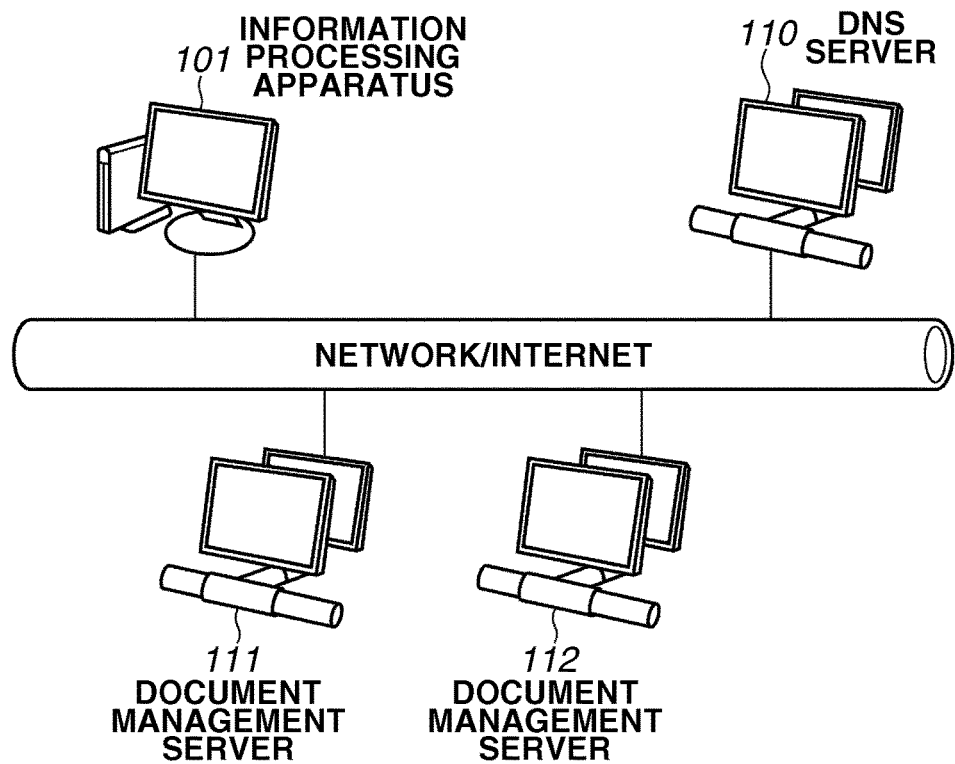
FIGS. 1A and 1B illustrate an example of a system configuration and an example of a hardware configuration, respectively.
Figure 1B:
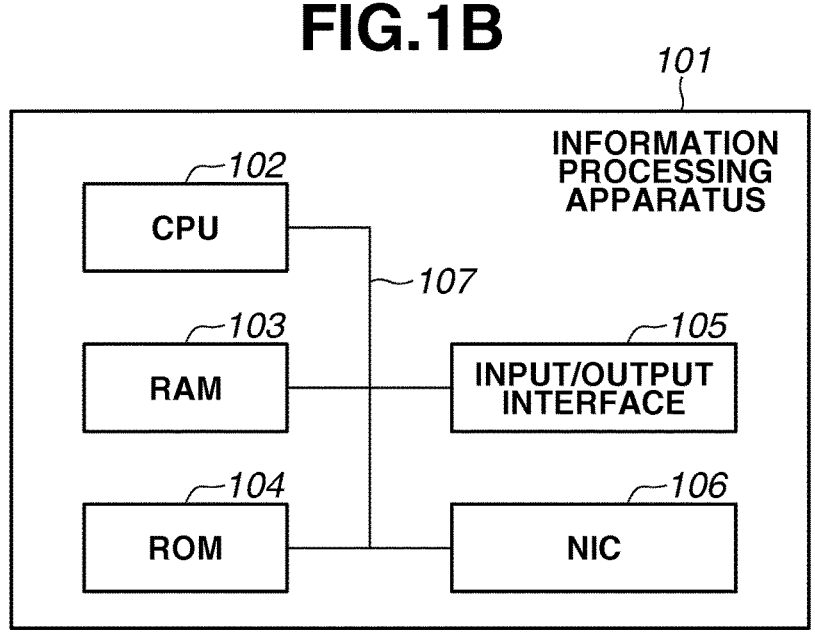

The following describes a system configuration and a hardware configuration of an information processing apparatus 101 according to the present exemplary embodiment with reference to FIGS. 1A and 1B. FIGS. 1A and 1B illustrate an example of a system configuration and an example of a hardware configuration of the information processing apparatus 101, respectively. The following describes the system configuration with reference to FIG. 1A. The information processing apparatus (computer) 101 is connected to the Internet via a network. A DNS server 110, a document management server 111, and a document management server 112 are connected to the network/Internet. Although the present exemplary embodiment uses one information processing apparatus 101, a plurality of the information processing apparatuses 101 may be used. The network/Internet includes wired or wireless communication line networks supporting the Transmission Control Protocol/Internet Protocol (TCP/IP).

The information processing apparatus 101 further includes various units 102 to 107. In the present specification, the DNS server 110, the document management server 111, and the document management server 112 have the same configuration as that of the information processing apparatus 101.

The hardware configuration will be described in detail below with reference to FIG. 1B. A central processing unit (CPU) 102 executes various programs to implement various functions according to the programs. A read-only memory (ROM) 104 stores various programs and data. A random access memory (RAM) 103 stores various information. The RAM 103 is also used as a temporary working memory area for the CPU 102. For example, the CPU 102 loads a program and data stored in the ROM 104 into the RAM 103, and executes the program.

An input/output interface 105 transmits data to a display (not illustrated) connected to the information processing apparatus 101, and receives data from a pointing device (not illustrated).

A Network Interface Card (NIC) 106 connects the information processing apparatus 101 to the network. The above-described units are capable of transmitting and receiving data via a bus 107.

[Software Configuration (Overall Configuration)]

The following describes a software configuration of the information processing apparatus 101 with reference to FIG. 2. FIG. 2 illustrates an example of the software configuration of the information processing apparatus 101.

Programs for achieving the functions of a client application 200 illustrated in FIG. 2 are stored in the ROM 104 of the information processing apparatus 101. Specifically, when the CPU 102 loads a program into the RAM 103 and executes it, apparatus functions and processing of flowcharts (described below) are achieved. All or a part of apparatus functions and processing of flowcharts (described below) may be achieved by using dedicated hardware.

[Software Configuration (OS)]

The following describes an operating system (OS) 212. The OS 212 offers well-known general OS functions (memory management, resource management, and application management functions). Upon receiving an application activation request from a user via a shortcut or a menu screen, the OS 212 issues an execution request to an application. Thus, the application starts the activation processing.

[Software Configuration (Client Application)]

The following describes a software configuration of the client application 200. The client application 200 includes the following units 201 to 211.

A main control unit 201 controls the client application 200 to instruct and manage each unit (described below). An information display unit 202 provides the user with a UI of the client application 200 in response to an instruction from the main control unit 201. When the client application 200 is activated, a plug-in management unit 203 recognizes and manages a plug-in unit group (a plug-in unit A 206 and a plug-in unit B 209) provided under a predetermined folder. Similar to the plug-in unit A 206 and the plug-in unit B 209 to be described below, a plug-in unit may be installed by storing it in the predetermined folder and uninstalled by deleting it from the predetermined folder.

A library determination unit 205 performs library determination processing based on a value input in the information display unit 202.

The plug-in unit A 206 includes a plug-in unit A library determination unit 207 and a plug-in unit A library access unit 208. The plug-in unit A library determination unit 207 performs library determination processing specific to the plug-in unit A 206. The plug-in unit A library access unit 208 accesses an external document management system. Each plug-in unit stores a property value of a library class to uniquely determine a plug-in unit. The library class of the plug-in unit A 206 is "AAA Library".

The plug-in unit B 209 has a similar configuration to that of the plug-in unit A 206, and includes a plug-in unit B library determination unit 210 and a plug-in unit B library access unit 211. The plug-in unit B library determination unit 210 performs library determination processing specific to the plug-in unit B 209. The plug-in unit B library access unit 211 accesses the external document management system. The library class of the plug-in unit B 209 is "BBB Library".

Figure 3:
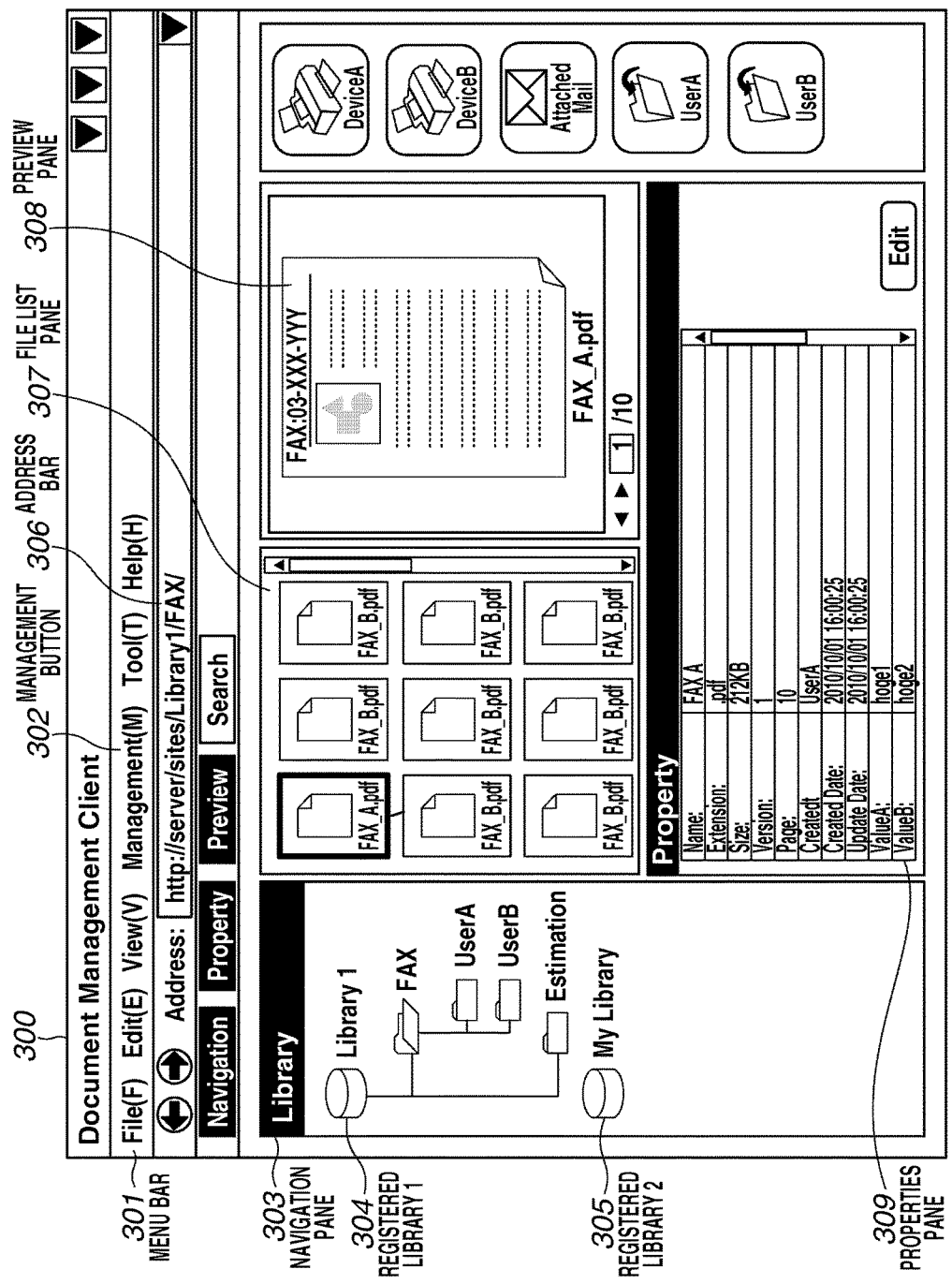
FIG. 3 illustrates an example of a main user interface (UI).

FIG. 3 illustrates an example of a main UI 300 of the client application 200. A menu bar 301 displays items (options) for inputting setting values in the client application 200. When the user operates a UI of the client application 200, library registration processing (described below) is performed.

The UI forms (position, size, range, layout, display information, etc.) of the client application 200 are not limited to those illustrated in the FIG. 3. A configuration suitable for achieving the functions of the information processing apparatus 101 may be used.

An operation information acquisition unit (not illustrated) acquires information that the user operates the UI of the client application 200 displayed on the information display unit 202, and notifies the acquired information of the main control unit 201. The main control unit 201 suitably stores the information in a storage unit 204 (described below).

The storage unit 204 stores setting values input by the user via the information display unit 202 and the operation information acquisition unit, in other words, via the UI of the client application 200.

A Management button 302 is used to display a library management screen 400 (described below).

A navigation pane 303 displays in a tree form registered libraries which has been registered on the library management screen 400 (described below). In the example, a registered library 1 (a registered library name of "Library 1") 304 and a registered library 2 (a registered library name of "My Library") 305 are registered and displayed as a library.

An address bar 306 is a text box for displaying the address of an object being currently selected by the user. When the user inputs an address to the address bar 306, resources (folders and files) corresponding to the address may be displayed. Processing in that case will be described in detail below with reference to FIG. 6.

A file list pane 307 displays an address input to the address bar 306, or folders and files under a folder object selected in the navigation pane 303.

A preview pane 308 displays a preview image of a file selected in the file list pane 307.

A properties pane 309 displays property values of a folder and a file selected in the file list pane 307.

Figure 4A:
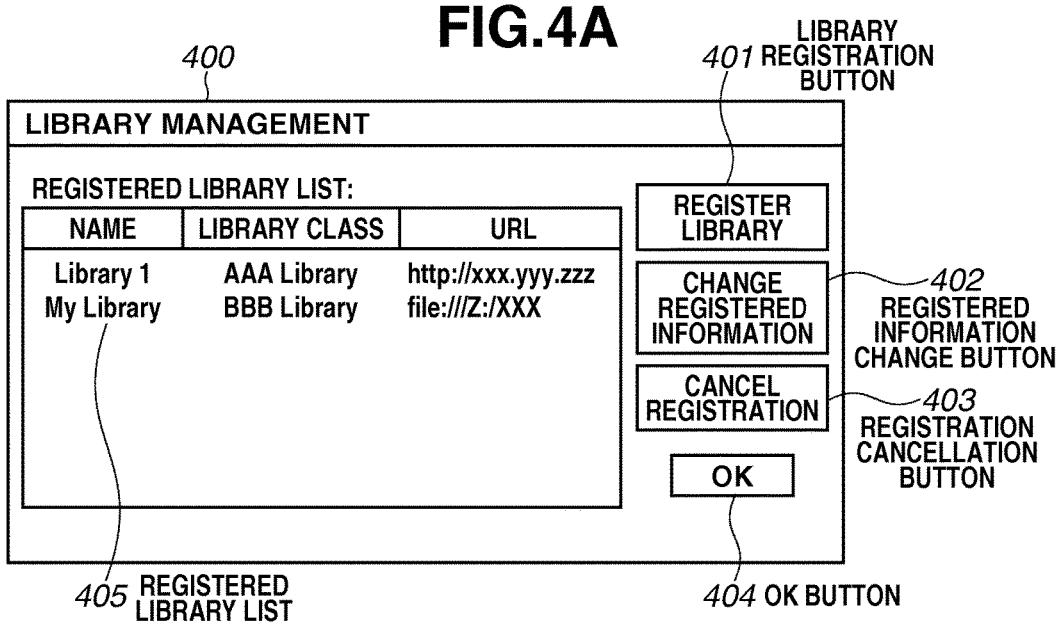
FIGS. 4A, 4B, and 4C illustrate examples of library registration setting screens.

FIG. 4A illustrates an example of a UI screen for library management. The library management screen 400 is used for library-related system setting, and is displayed when the user presses the Management button 302.

A registered library list 405 displays a list of registered libraries.

A library registration button 401 is used to display a library selection screen (described below) for registering libraries.

A registered information change button 402 is used to change registered libraries (library information described below). When the user selects a registered library in the registered library list 405 and then presses the registered information change button 402, a registered library information change screen (not illustrated) appears to allow the user to change the library information.

A registration cancellation button 403 is used to cancel registration of a registered library. When the user selects a registered library in the registered library list 405, and then presses the registration cancellation button 403, the selected library is deleted.

When the user presses an OK button 404, the library management screen 400 closes.

Figure 4B:
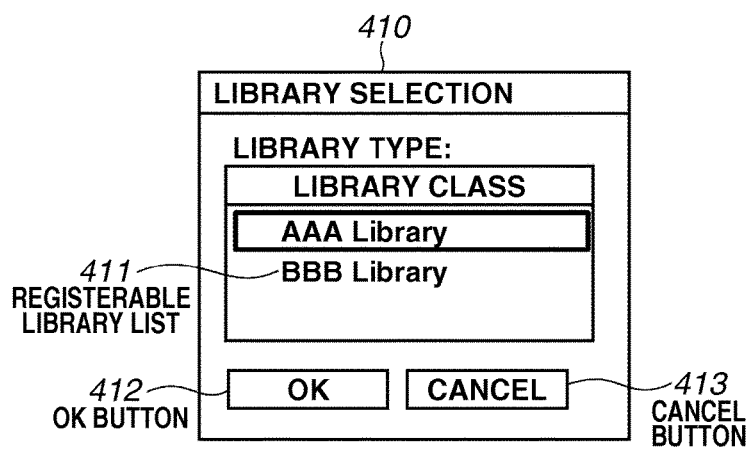

FIG. 4B illustrates an example of a UI screen for library selection. A library selection screen 410 is used to select a library class to register a library. A registerable library list 411 displays in a list form a result of the plug-in management unit 203 reading registerable libraries (the plug-in unit group). When the user selects a library class in the registerable library list 411 and then presses the OK button 412, a library communication destination setting screen 420 (described below) appears. A CANCEL button 413 is used to cancel the library registration processing. When the user presses the CANCEL button 413, the library management screen 400 appears again.

Figure 4C:
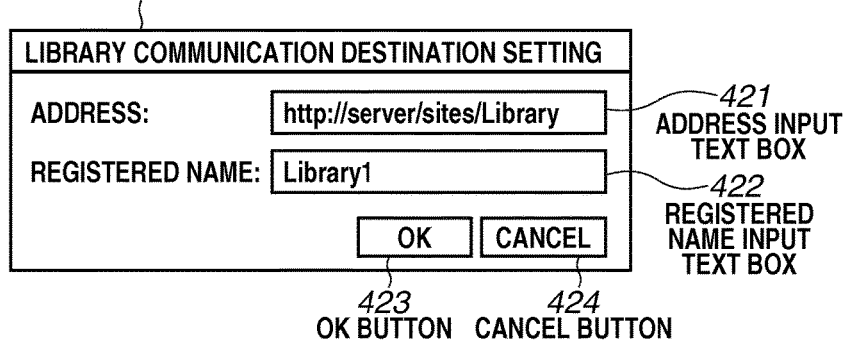

FIG. 4C illustrates an example of a UI screen for library communication destination setting. The library communication destination setting screen 420 is used to set a library communication destination. An address input text box 421 (a receiving portion) is used to input registered library addresses (registered library addresses 503 and 506 to be described below). A registered name input text box 422 is used to input registered library names (registered names 504 and 507 to be described below). An OK button 423 is used to apply the settings. When the user presses the OK button 423, the main control unit 201 stores the setting values of a library information 500 (described below) in the storage unit 204. A CANCEL button 424 is used to cancel the settings. A plurality of identical library classes may be set by using different addresses.

[Data Structure (Library Information 500)]

Figure 5:
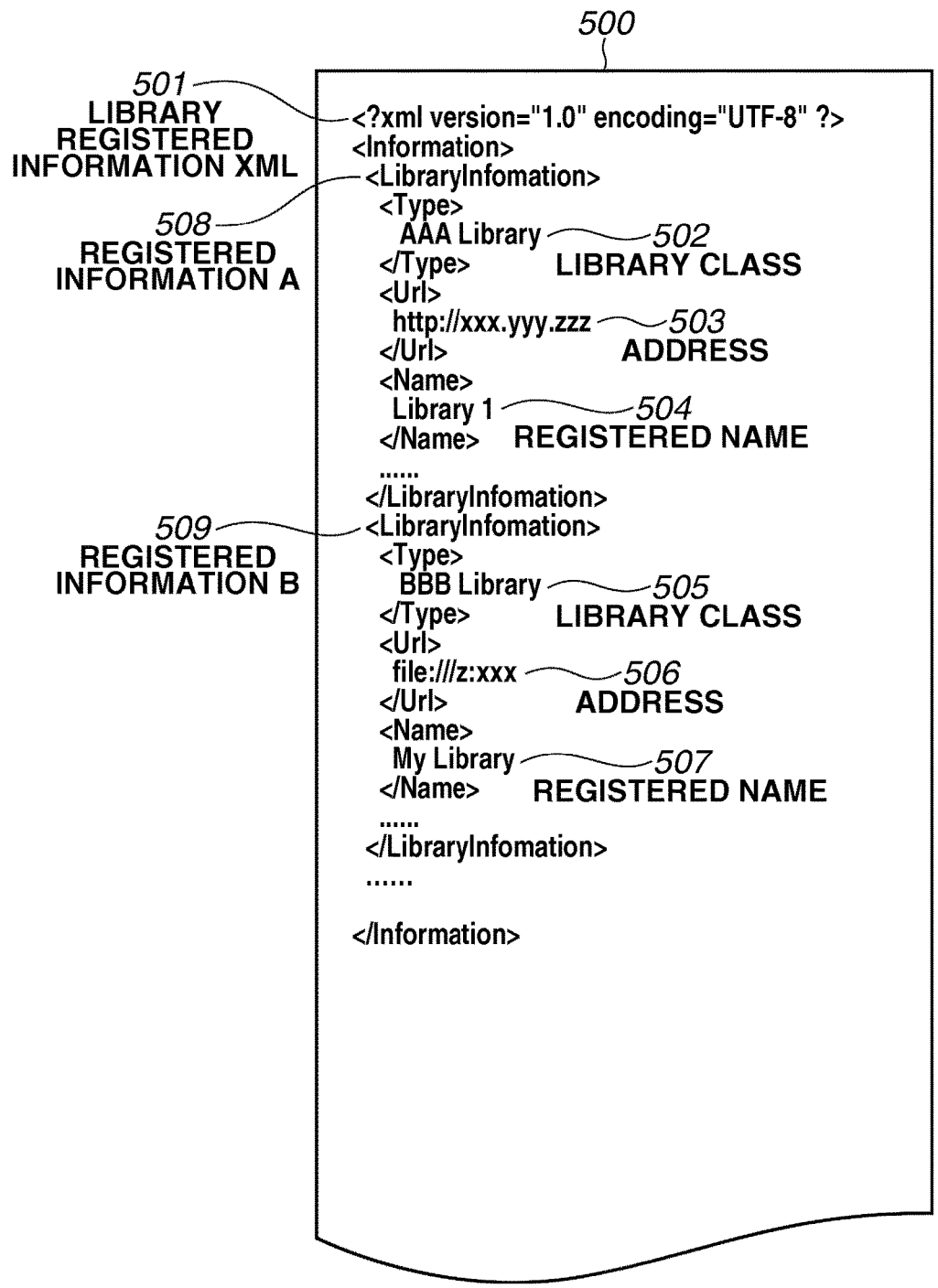
FIG. 5 illustrates an example of a data structure of library information.

The following describes data of library information to be registered by the library registration processing with reference to FIG. 5.

FIG. 5 illustrates an example (library registered information Extensible Markup Language (XML) 501) of a data structure registered in the library information 500. Library classes 502 and 505 correspond to the library class selected in the registerable library list 411 of the library selection screen 410. The addresses 503 and 506 correspond to a value input to the address input text box 421 of the library communication destination setting screen 420. The registered names 504 and 507 correspond to a value input to the registered name input text box 422. The library information 500 is stored in the storage unit 204. Registered information A 508 (the library class 502, the address 503, and the registered name 504) is an example when the plug-in unit A 206 is registered as a library. Registered information B 509 (the library class 505, the address 506, and the registered name 507) is an example when the plug-in unit B 209 is registered as a library.

[Resource Identification Processing Flow]

Figure 6:
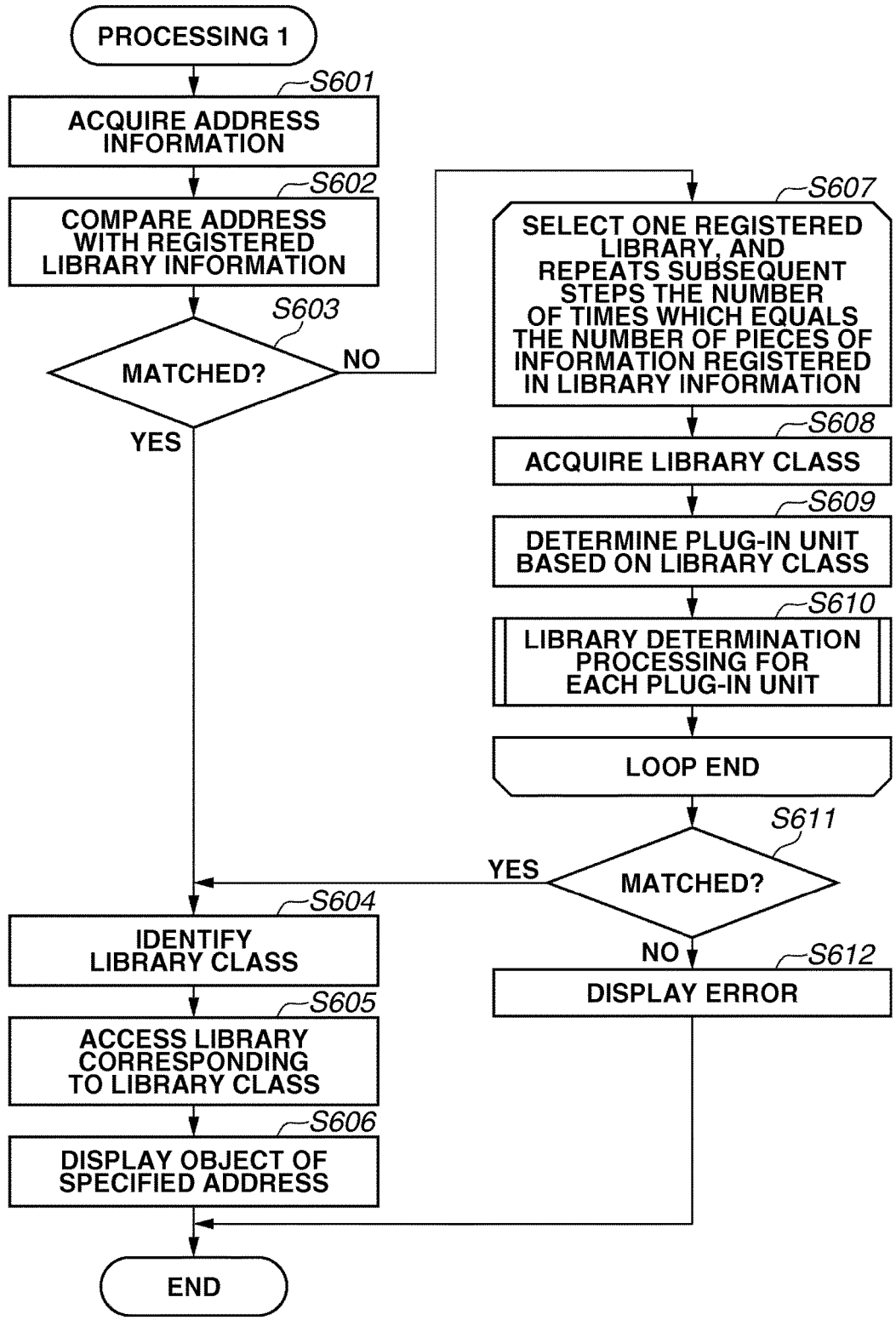
FIG. 6 is a flowchart illustrating an example of resource identification processing.

FIG. 6 is a flowchart illustrating an example of processing for the client application 200 accessing a resource corresponding to an address. When the user inputs a character string (address) in the address bar 306 of the client application 200 of the information processing apparatus 101, the client application 200 performs processing for accessing a resource corresponding to an address based on the processing illustrated in FIG. 6.

In step S601, when the user inputs a character string to the address bar 306, the main control unit 201 of the client application 200 acquires the character string input in the address bar 306 via the operation information acquisition unit.

In step S602, the main control unit 201 causes the library determination unit 205 to compare the input character string with the addresses 503 and 506 in the library information 500 on a substring comparison basis. For example, when an input character string ("http://xxx.yyy.zzz/hoge/hoge") is compared with the address 503 ("http://xxx.yyy.zzz") on a substring comparison basis, the result of the comparison is "matched" (True). Further, when an input character string ("http://192.168.0.1/hoge/hoge") is compared with the address 503 ("http://xxx.yyy.zzz"), the result of the comparison is "mismatched" (False).

In that case, the protocol type may be removed before the character string comparison or the substring comparison. More specifically, in the above-described example, "xxx.yyy.zzz" may be compared with "xxx.yyy.zzz/hoge/hoge". Further, after the protocol type and the folder are removed, "192.168.0.1" may be compared with "xxx.yyy.zzz".

In step S603, the main control unit 201 determines the result of the comparison between the input character string and the address 503. When the result of the comparison is True (YES in step S603), the processing proceeds to step S604. Otherwise, when the result of the comparison is False (NO in step S603), the processing proceeds to step S607.

The following describes a case where the registered information A 508 matches the input character string.

In step S604, the main control unit 201 recognizes a corresponding plug-in unit based on the library class 502 of the address 503 determined to be matched by the library determination unit 205. In the case of the registered information A 508, the library class 502 is "AAA Library" and therefore the corresponding plug-in unit is determined to be the plug-in unit A 206.

In step S605, the plug-in unit A library access unit 208 of the plug-in unit A 206 accesses the document management server 111 by using Hypertext Transmission Protocol (HTTP) or Hypertext Transmission Protocol Secure (HTTPS) as a communication method to acquire resource information (information about folders and files) of the input character string (address).

The following describe a case where the corresponding plug-in unit is determined to be the plug-in unit B 209 in step S604. In step S605, the plug-in unit B library access unit 211 accesses the document management server 112 by using Server Message Block (SMB) or Common Internet File System (CIFS) as a communication method to acquire resource information (information about folders and files) of the input character string (address).

In step S606, the main control unit 201 displays the acquired resource information on the main UI 300. In the main UI 300 in that case, the corresponding registered library 1 304 is selected in the navigation pane 303, and an object of the corresponding resource on the tree is selected (highlighted) in the file list pane 307. If the object is a document file, a preview of the document file is displayed on the preview pane 308. Further, properties of the object are displayed in the properties pane 309.

This allows the user to easily identify a library to which the input address corresponds, even if a plurality of libraries is displayed on the tree.

When the result of the comparison is "mismatched" (False) in step S603, then in step S607, the main control unit 201 repeats steps S608 to S610 the number of times which equals the number of pieces of information registered in the library information 500 (twice in the case of the library registered information XML 501).

In step S608, the main control unit 201 acquires the library class from the library information 500. In the case of the registered information A 508, the library class is the library class 502 of "AAA Library". In the case of the registered information B 509, the library class is the library class 505 of "BBB Library".

In step S609, when the library class is "AAA Library", the main control unit 201 determines the corresponding plug-in unit to be the plug-in unit A 206, and, when the library class is "BBB Library", the main control unit 201 determines the corresponding plug-in unit to be the plug-in unit B 209.

In step S610, each of the plug-in unit A library determination unit 207 of the plug-in unit A 206 and the plug-in unit B library determination unit 210 of the plug-in unit B 209 performs the library determination processing. A detailed processing flow will be described below.

In step S611, the main control unit 201 determines the result of the comparison. When the result of the comparison in step S610 is True (YES in step S611), the processing proceeds to step S604. Otherwise, when the result of the comparison is False (NO in step S611), the processing proceeds to step S612.

In step S612, the main control unit 201 displays an error.

When the main control unit 201 determines that the result of the comparison in step S602 is False (NO in step S603) and that the result of the comparison in step S610 is True (YES in step S611), the address of the registered library information may be displayed, instead of the input character string, in the address bar 306 in steps S604 to S606.

[Library Determination Processing Flow by the Plug-in Unit A Library Determination Unit 207]

Figure 7:
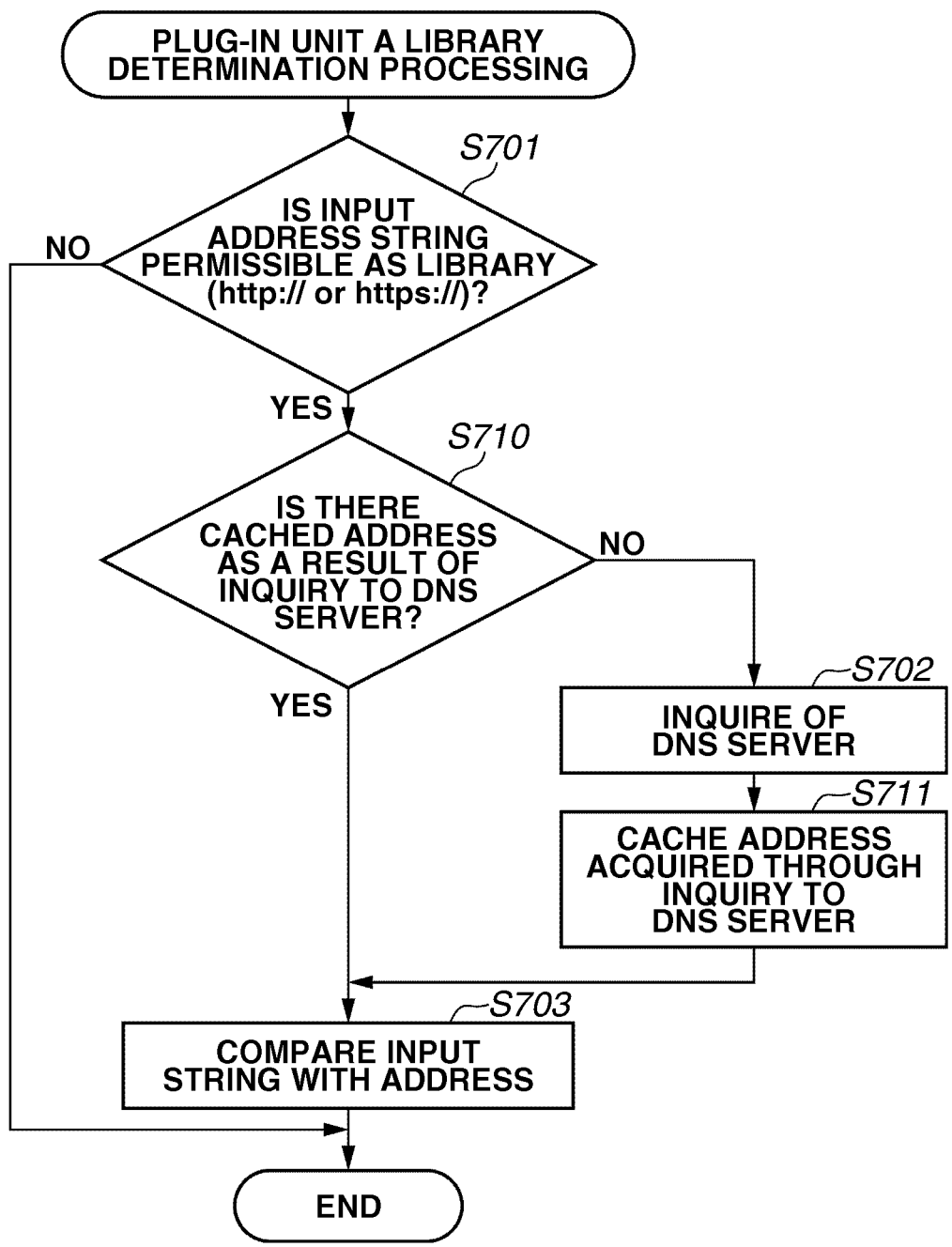
FIG. 7 is a flowchart illustrating an example of library determination processing performed by a plug-in unit A.

The following describes the library determination processing in step S610 performed by the plug-in unit A library determination unit 207 of the plug-in unit A 206 with reference to FIG. 7. FIG. 7 is a flowchart illustrating an example of the library determination processing performed by the plug-in unit A library determination unit 207.

In step S701, the plug-in unit A library determination unit 207 determines whether the input character string (for example, "http://192.168.0.1/hoge/hoge") is permissible as the plug-in unit A. Specifically, the plug-in unit A library determination unit 207 determines whether the input character string is suitable as an access destination address for the document management server 111. The plug-in unit A library determination unit 207 determines whether the prefix of the input character string is "http://" or "https://". When the prefix of the input character string is determined to be "http://" or "https://" (YES in step S701), the processing proceeds to step S710. Otherwise, when the prefix of the input character string is not determined to be "http://" or "https://" (NO in step S701), the processing end.

In step S710, the plug-in unit A library determination unit 207 determines whether there exists a cached address as a result of inquiring of the DNS server 110 in step S711 (described below). When a cached address is determined to exist (YES in step S710), the processing proceeds to step S703. Otherwise, when a cached address is determined not to exist (NO in step S710), the processing proceeds to step S702.

In step S702, the plug-in unit A library determination unit 207 inquires of the DNS server 110 the address 503 ("http://xxx.yyy.zzz"). In that case, the result of inquiring of the DNS server 110 is assumed that, for example, "xxx.yyy.zzz"="192.168.0.1". The information processing apparatus 101 is able to acquire an address in a different notation format by inquiring of the DNS server 110.

If the result is not returned from the DNS server 110 within a predetermined time period after the plug-in unit A library determination unit 207 has inquired of the DNS server 110, a time-out error occurs, and the processing ends without executing step S703. In that case, the result of the address comparison in step S703 (described below) is determined to be "mismatched".

In step S711, the plug-in unit A library determination unit 207 caches the address in a different notation format and acquired by inquiring of the DNS server 110 in step S702.

Figure 8:
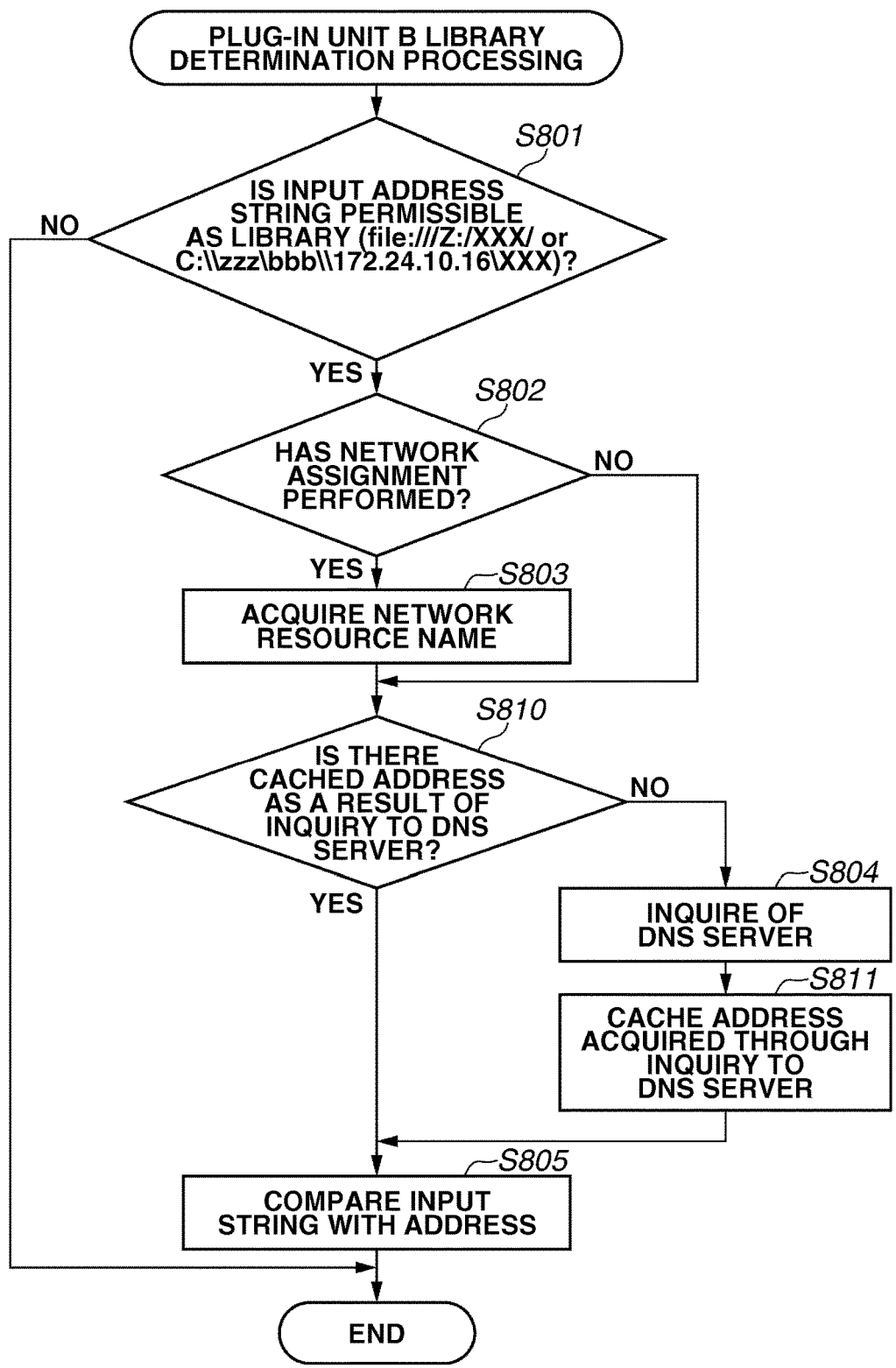
FIG. 8 is a flowchart illustrating an example of library determination processing performed by a plug-in unit B.

The following describes matters common to the processing illustrated in FIGS. 7 and 8.

In the present specification, when the information processing apparatus 101 acquires an address from the DNS server 110, the information processing apparatus 101 acquires only one address. Specifically, even if the DNS server 110 has addresses in a plurality of different notation formats for an identical address, the information processing apparatus 101 acquires only one address out of the addresses in the plurality of different notation formats. This enables the information processing apparatus 101 to perform processing for inquiring of the DNS server 110 at high speed. However, the information processing apparatus 101 may acquire all of the addresses in the plurality of different notation formats.

If the information processing apparatus 101 is not able to establish communication with the DNS server 110 as a result of an attempt to inquire of the DNS server 110, the information processing apparatus 101 is not able to naturally acquire addresses in the plurality of different notation formats. Therefore, if the information processing apparatus 101 is not able to establish communication with the DNS server 110, the plug-in unit A library determination unit 207 does not cache the address. Assuming that, if the information processing apparatus 101 is not able to establish communication with the DNS server 110, the information processing apparatus 101 needs to subsequently inquire of the DNS server 110 the same address as the one for the failed inquiry. In that case, the information processing apparatus 101 is able to attempt to establish communication with the DNS server 110 again. If communication is established, the information processing apparatus 101 is able to further attempt to acquire an address in a different notation format. Specifically, referring to FIG. 7, if the plug-in unit A library determination unit 207 determines that there is no cached address (NO in step S710), then in step S702, the plug-in unit A library determination unit 207 inquires of the DNS server 110 again.

When there exists no address in a different notation format as a result of inquiring of the DNS server 110 and therefore the information processing apparatus 101 is not able to acquire any address in a different notation format, the plug-in unit A library determination unit 207 may also cache information about failure to acquire any address in a different notation format. With the configuration, when there exists information about failure to acquire any address in a different notation format, the information processing apparatus 101 does not inquire of the DNS server 110. Also in that case, referring to FIG. 7, the result of the address comparison in step S703 is determined to be "mismatched".

This completes descriptions of matters common to the processing illustrated in FIGS. 7 and 8.

In step S703, the plug-in unit A library determination unit 207 compares the input character string ("http://192.168.0.1/hoge/hoge") with the address 503 ("http://192.168.0.1") taking into account the result of inquiring of the DNS server 110, on a substring comparison basis, and determines the result of the comparison: "matched" (True) or "mismatched" (False).

[Library Determination Processing Flow by the Plug-in Unit B Library Determination Unit 210]

The following describes the library determination processing in step S610 performed by the plug-in unit B library determination unit 210 of the plug-in unit B 209, with reference to FIG. 8. FIG. 8 is a flowchart illustrating an example of the library determination processing performed by the plug-in unit B library determination unit 210.

In step S801, the plug-in unit B library determination unit 210 determines whether the input character string (for example, "\\192.168.0.2\xxx\yyy") is permissible for the plug-in unit B 209. Specifically, the plug-in unit B library determination unit 210 determines whether the input character string is suitable as an access destination address for the document management server 112. The plug-in unit B library determination unit 210 determines whether the prefix of the input character string is "file:///", "\\", or "*://". When the prefix of the input string is determined to be "file:///", "\\", or "*://" (YES in step S801), the processing proceeds to step S802. Otherwise, when the prefix of the input string is determined not to be "file:///", "\\", or "*://" (NO in step S801), the processing ends.

In step S802, the plug-in unit B library determination unit 210 inquires of the OS 212 of the information processing apparatus 101 whether the address 506 ("file:///z:xxx") is assigned to the network. Specifically, the plug-in unit B library determination unit 210 determines whether a network path is assigned to the drive letter (in that case, drive z) of the OS. When the address 506 is assigned to the network (YES in step S802), the processing proceeds to step S803. Otherwise, when the address 506 is not assigned to the network (NO in step S802), the processing proceeds to step S810.

In step S803, the plug-in unit B library determination unit 210 acquires a network resource name from the OS. In that case, drive z is assumed to be assigned to "\\aaa.bbb.ccc".

In step S810, the plug-in unit B library determination unit 210 determines whether there exists a cached address as a result of inquiring of the DNS server 110 in step S811 (described below). When a cached address is determined to exist (YES in step S810), the processing proceeds to step S805. Otherwise, when a cached address is determined not to exist (NO in step S810), the processing proceeds to step S804.

In step S804, the plug-in unit B library determination unit 210 inquires of the DNS server 110 the address 506 ("\\aaa.bbb.ccc\xxx"). In that case, the result of inquiring of the DNS server 110 is assumed to be "aaa.bbb.ccc"="192.168.0.2".

If a result of the inquiry is not returned from the DNS server 110 within a predetermined time period after the plug-in unit B library determination unit 210 inquired of the DNS server 110, a time-out error occurs, the processing ends without executing step S804. In that case, the result of the address comparison in step S805 (described below) is determined to be "mismatched".

In step S811, the plug-in unit B library determination unit 210 caches the address in a different notation format acquired by inquiring of the DNS server 110 in step S804.

In step S805, the plug-in unit B library determination unit 210 compares the input character string ("\\192.168.0.2\xxx\yyy") with the address 503 ("\\192.168.0.1\xxx") taking into account the result of inquiring of the DNS server 110, on a substring comparison basis, and determines the result of the comparison: "matched" (True) or "mismatched" (False).

As described in the descriptions for step S602, the protocol type and prefix may be removed before performing character string comparison or substring comparison. Not only the protocol type and prefix but also the folder may be removed before performing character string comparison or substring comparison.

Although the processing illustrated in FIGS. 6, 7, and 8 is started when the user inputs a character string to the address bar 306, the same processing may be performed when the user double-clicks a shortcut.

Figure 9:
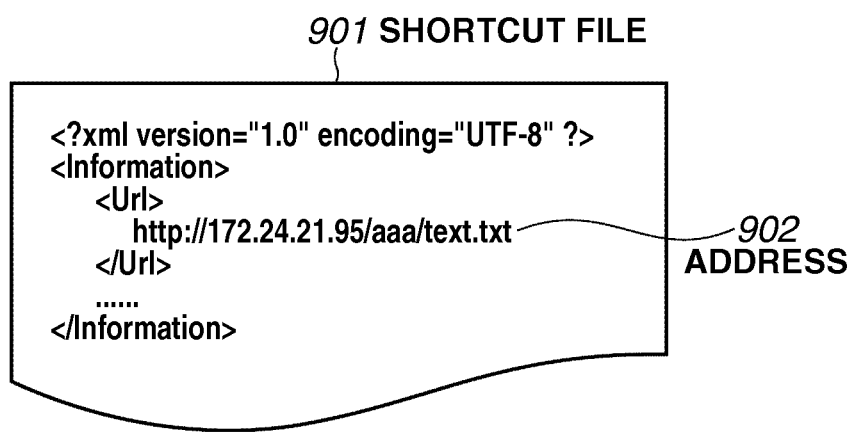
FIG. 9 illustrates an example of a data structure of a shortcut.

FIG. 9 illustrates an example of a data structure of a shortcut file. A shortcut file 901 is described in the XML format. An address 902 is an access destination address of the document management server 111 or 112.

When the user double-clicks the shortcut file 901, the OS recognizes the extension of the shortcut file, and activates an associated application (in that case, the client application 200). The main control unit 201 of the client application 200 reads the address 902 from the shortcut file 901, and advances the processing to step S602. Then, the main control unit 201 performs similar processing to the above-described processing.

As described above, the main control unit 201 performs not only simple character string comparison between the input character string and the address in the library information 500 (S603) but also plug-in-specific comparison processing via the plug-in unit A library determination unit 207 of the plug-in unit A 206 and the plug-in unit B library determination unit 210 of the plug-in unit 209. Thus, it is possible to determine whether the input character string is a suitable Uniform Resource Identifier (URI), and further determine a suitable communication method (the plug-in unit A library access unit 208 or the plug-in unit B library access unit 211) for the URI. The above-described processing makes it easier for the user to communicate with the document management server 111 or 112, making it easier to use an application.

A second exemplary embodiment will be described below.

In the present exemplary embodiment, components identical to those in the first exemplary embodiment are assigned the same reference numeral, and redundant descriptions thereof will not be repeated.

At the time of library communication destination setting, when the user inputs a registered library address and a registered library name, and then press the OK button 423 in the library communication destination setting screen 420 illustrated in FIG. 4C, the following library information setting processing is performed.

[Library Information Setting Processing Flow]

Figure 10:
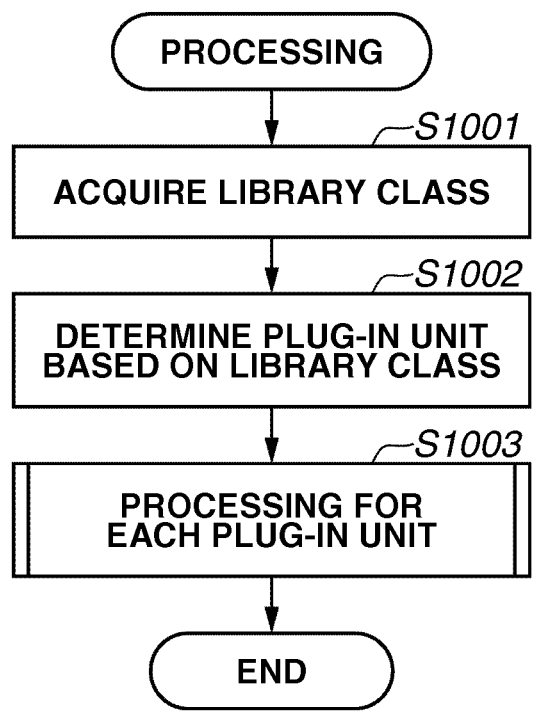
FIG. 10 is a flowchart illustrating an example of library information setting processing.

The following describes the library information setting processing performed by the client application 200 of the information processing apparatus 101, with reference to FIG. 10. FIG. 10 is a flowchart illustrating an example of the library information setting processing performed by the client application 200.

In step S1001, when the user presses the OK button 423, the main control unit 201 of the client application 200 acquires the library class (in the example, "AAA Library" and "BBB Library") selected in the registerable library list 411 illustrated in FIG. 4B.

In step S1002, when the library class is "AAA Library", the main control unit 201 determines the corresponding plug-in unit to be the plug-in unit A 206, and, when the library class is "BBB Library", the main control unit 201 determines the corresponding plug-in unit to be the plug-in unit B 209.

In step S1003, the plug-in unit A library determination unit 207 of the plug-in unit A 206 and the plug-in unit B library determination unit 210 of the plug-in unit 209 perform the library identification processing. A detailed processing flow will be described below.

[Library Identification Processing Flow by the Plug-in Unit a Library Determination Unit 207]

Figure 11:
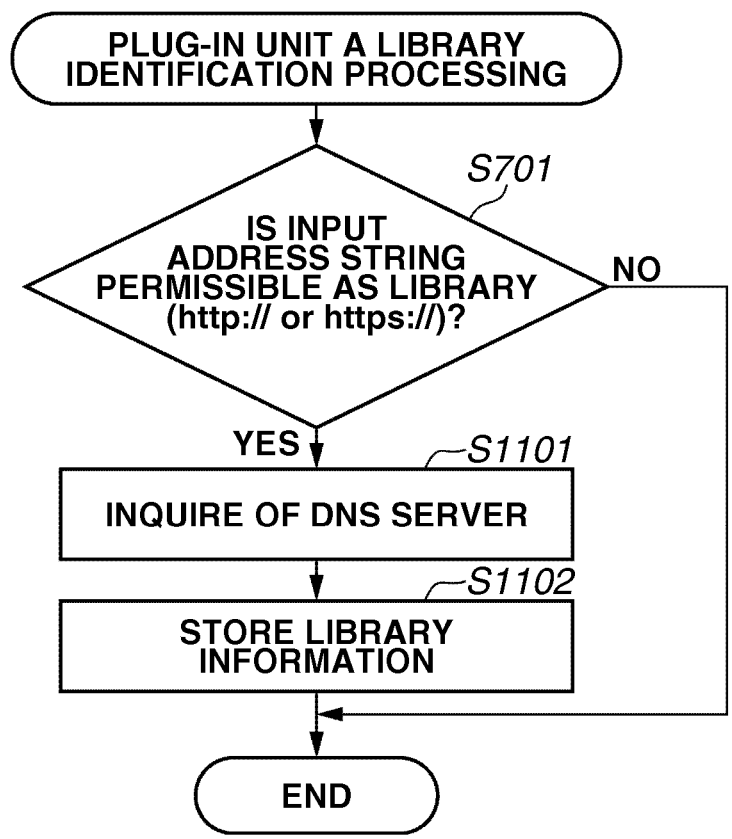
FIG. 11 is a flowchart illustrating an example of library identification processing performed by the plug-in unit A.

The following describes library identification processing in step S1003 performed by the plug-in unit A library determination unit 207 of the plug-in unit A 206, with reference to FIG. 11. FIG. 11 is a flowchart illustrating an example of the library identification processing performed by the plug-in unit A library determination unit 207.

In step S1101, the plug-in unit A library determination unit 207 inquires of the DNS server 110 the input character string (for example, "http://xxx.yyy.zzz"). In that case, the result of the inquiry is assumed to be "xxx.yyy.zzz"="192.168.0.1".

In step S1102, the plug-in unit A library determination unit 207 stores library information 1300 (registered information A 1307) described below.

[Library Identification Processing Flow by the Plug-in Unit B Library Determination Unit 210]

Figure 12:
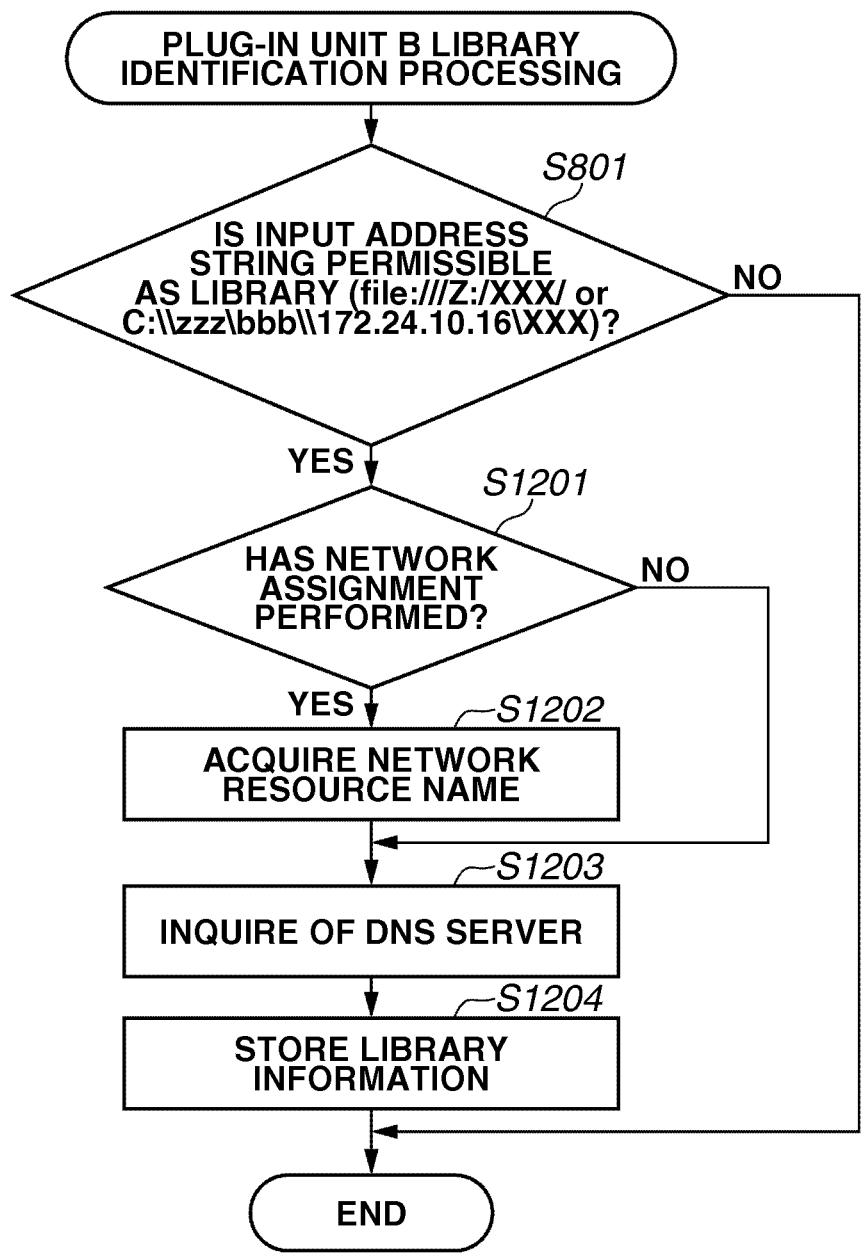
FIG. 12 is a flowchart illustrating an example of library identification processing performed by the plug-in unit B.

The following describes the library identification processing in step S1003 performed by the plug-in unit B library determination unit 210 of the plug-in unit B 209, with reference to FIG. 12. FIG. 12 is a flowchart illustrating an example of the library identification processing performed by the plug-in unit B library determination unit 210.

In step S1201, the plug-in unit B library determination unit 210 inquires of the OS 212 of the information processing apparatus 101 whether the input character string (for example, "file:///z:/xxx") is assigned to the network. When the input character string is assigned to the network (YES in step S1201), the processing proceeds to step S1202. Otherwise, when the input string is not assigned to the network (NO in step S1201), the processing proceeds to step S1203.

In step S1202, the plug-in unit B library determination unit 210 acquires a network resource name. In that case, drive z is assumed to be assigned to "\\aaa.bbb.ccc".

In step S1203, the plug-in unit B library determination unit 210 inquires of the DNS server 110 the address "\\aaa.bbb.ccc". In that case, the result of inquiring of the DNS server 110 is assumed to be "aaa.bbb.ccc"="192.168.0.2".

In step S1204, the plug-in unit B library determination unit 210 stores the library information 1300 (registered information B 1308) described below.

[Data Structure (Library Information 1300)]

Figure 13:
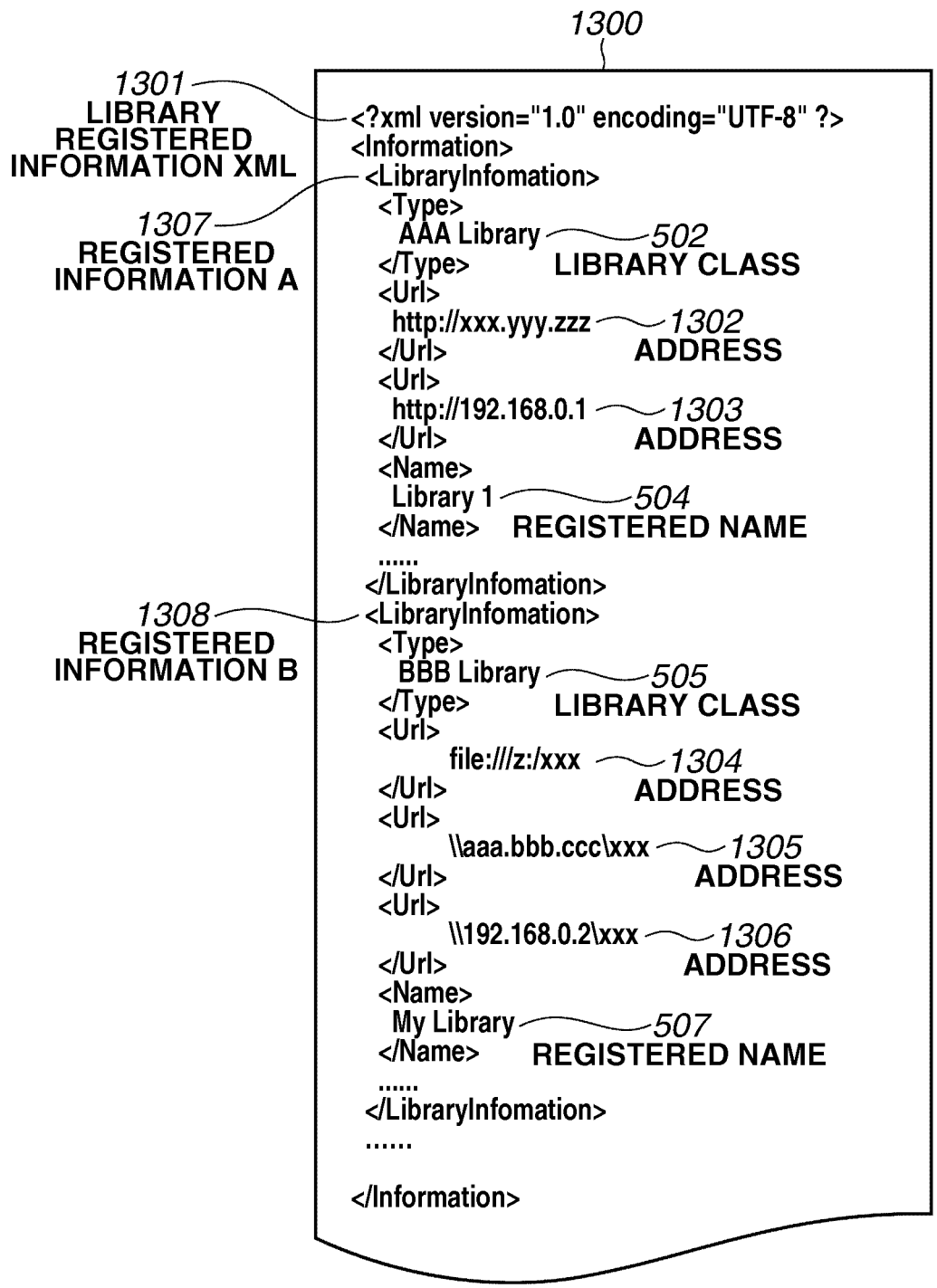
FIG. 13 illustrates an example of a data structure of library information.

The following describes data of the library information to be registered by the library registration processing, with reference to FIG. 13.

FIG. 13 illustrates an example of a data structure (library registered information XML 1301) of the library information 1300. The library classes 502 and 505 correspond to the library class selected in the registerable library list 411 of the library selection screen 410. The registered names 504 and 507 correspond to the value input in the registered name input text box 422. An address 1302 corresponds to the value input in the address input text box 421 of the library communication destination setting screen 420. An address 1303 corresponds to the value of the result of inquiring of the DNS server 110 in step S1101. An address 1304 corresponds to the value input to the address input text box 421 of the library communication destination setting screen 420. An address 1305 corresponds to the value of the result of inquiring of the DNS server 110 a network resource name in step S1202. An address 1306 corresponds to the value of the result of inquiring of the DNS server 110 in step S1203.

The library information 1300 is stored in the storage unit 204. The registered information A 1307 (the library class 502, the registered name 504 and the addresses 1302 and 1303) is an example of library information for a case where the plug-in unit A 206 is registered as a library. The registered information B 1308 (the library class 505, the registered name 507 and the addresses 1304, 1305, and 1306) is an example of library information for a case where the plug-in unit B 209 is registered as a library.

[Resource Identification Processing Flow]

Figure 14:
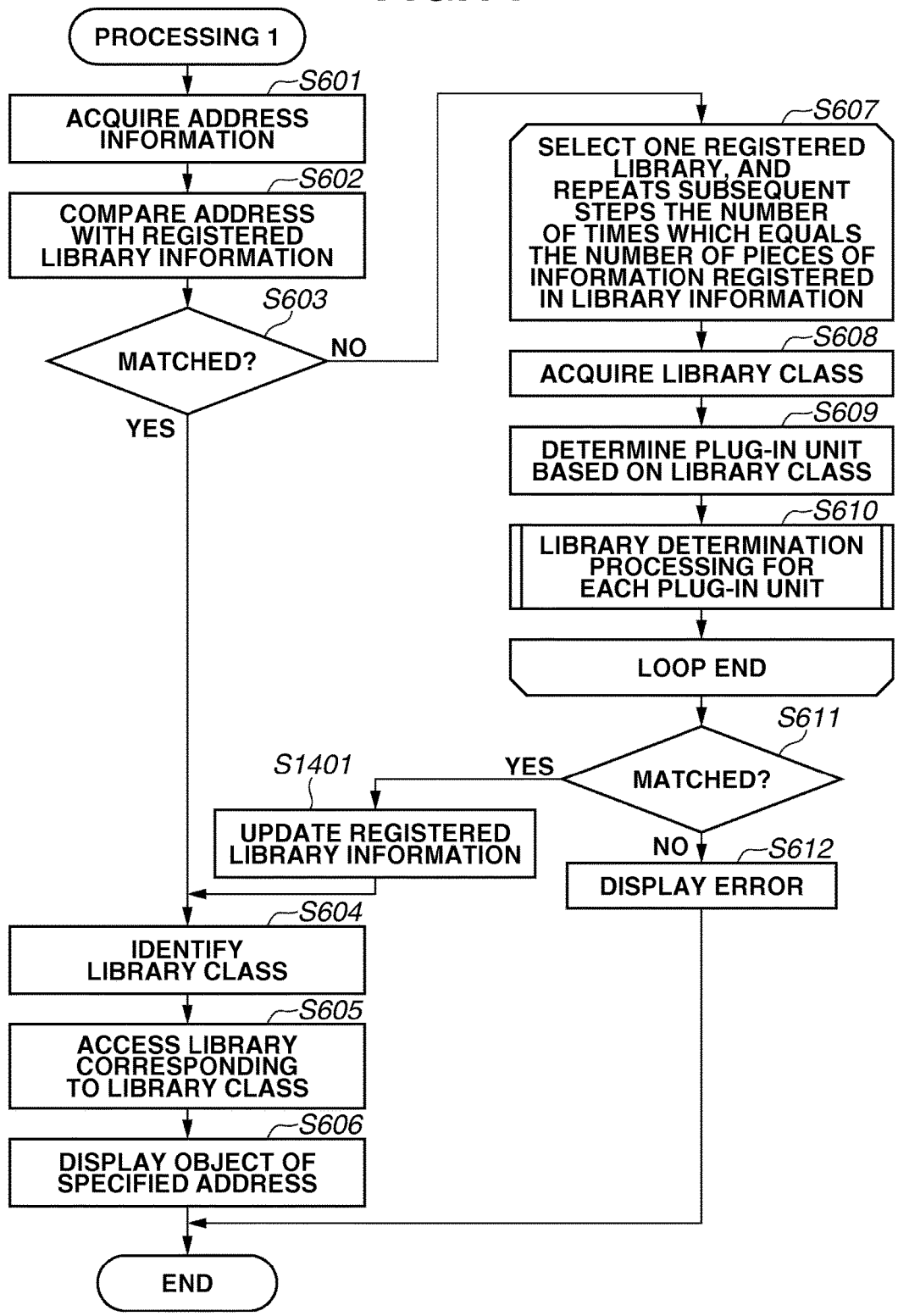
FIG. 14 is a flowchart illustrating an example of resource identification processing.

When the user inputs a character string (address) to the address bar 306 of the client application 200 of the information processing apparatus 101, the client application 200 of the information processing apparatus 101 accesses a resource corresponding to the address. The processing will be described below with reference to FIG. 14. FIG. 14 is a flowchart illustrating an example of processing for the client application 200 accessing a resource corresponding to an address.

In step S1401, the main control unit 201 appends the detected address to the library information 1300. For example, assuming that a URL "http://xxx.yyy.zzz" is registered in a library "Library 1" and that the information processing apparatus 101 acquires an IP address "192.168.0.1" from the DNS server 110 as a result of inquiring of the DNS server "xxx.yyy.zzz". In that case, the main control unit 201 appends "192.168.0.1" to the library information 1300 as a URL candidate for "Library 1". Thus, the library information 1300 is updated.

As described above, the main control unit 201 inquires of the DNS server 110 an address and stores the address when the main control unit 201 registers a library, and the main control unit 201 appends the address to the library information 1300 when the address is changed. That makes it unnecessary to inquire of the DNS server 110 each time. This processing reduces the number of times of inquiring of the DNS server 110, which leads to improvement of the performance.

In addition to updating the library information 1300, the URL registered in the library and the result of inquiring of the DNS server 110 may be cached in a memory. In particular, caching in the memory the result of inquiring of the DNS server 110 enables prevention of the information processing apparatus 101 from repetitively inquiring of the DNS server 110 while the client application 200 is activated.

A third exemplary embodiment will be described below.

In the present exemplary embodiment, components identical to those in the first exemplary embodiment are assigned the same reference numeral, and redundant descriptions thereof will not be repeated.

[Resource Identification Processing Flow]

Figure 15:
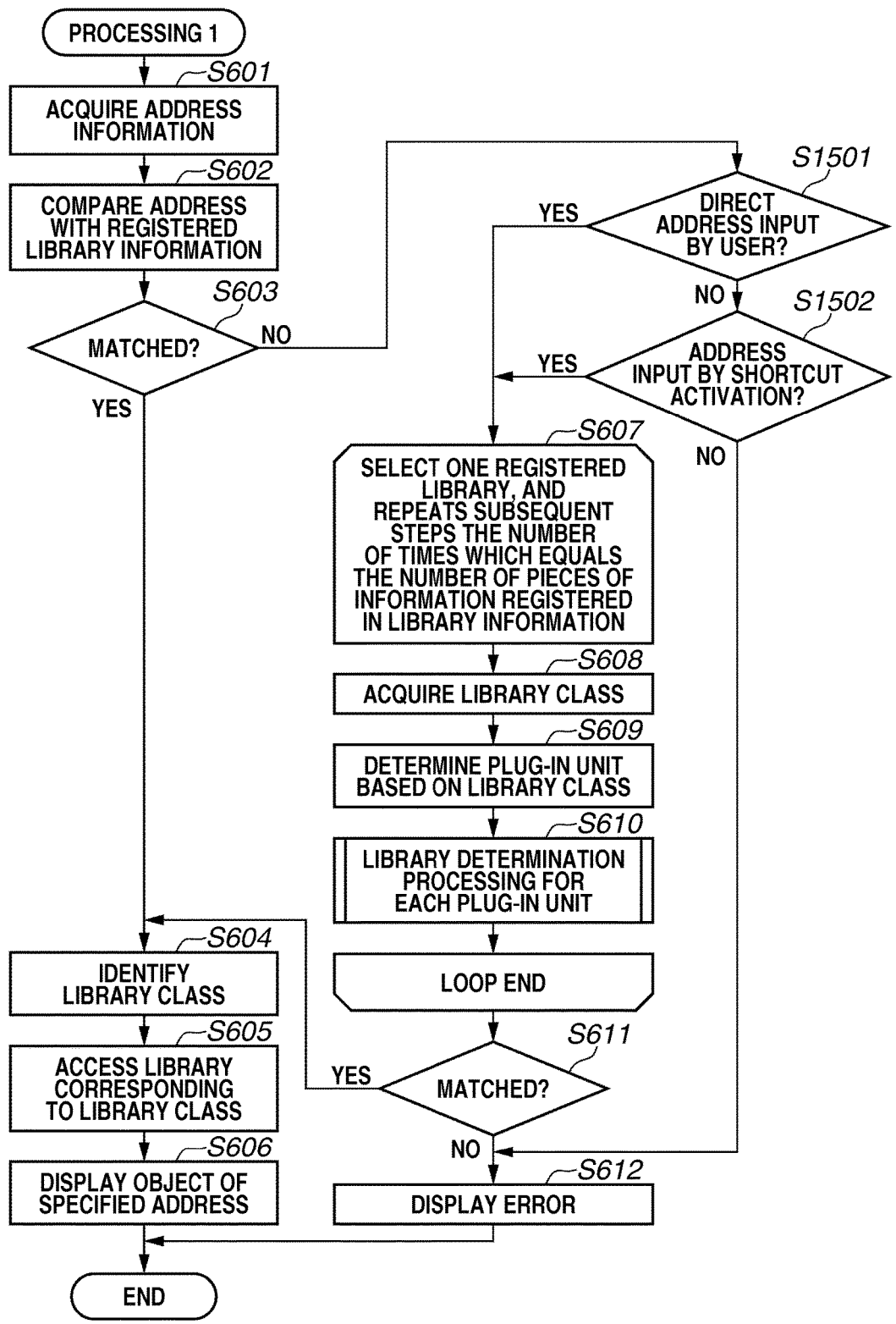
FIG. 15 is a flowchart illustrating an example of resource identification processing.

When the user inputs a character string (address) to the address bar 306 in the client application 200 of the information processing apparatus 101, the client application 200 of the information processing apparatus 101 accesses a resource corresponding to the address. The processing will be described below with reference to FIG. 15. FIG. 15 is a flowchart illustrating an example of processing for the client application 200 accessing a resource corresponding to an address.

In step S1501, the main control unit 201 determines whether the character string is input to the address bar 306 (direct input) by the user. When the character string is determined to be input to the address bar 306 by the user (YES in step S1501), the processing proceeds to step S607. Otherwise, when the character string is determined not to be input to the address bar 306 by the user (NO in step S1501), the processing proceeds to step S1502.

In step S1502, the main control unit 201 determines whether the character string is input via a shortcut activation. When the character string is determined to be input via a shortcut activation (YES in step S1502), the processing proceeds to step S607. Otherwise, when the character string is determined not to be input via a shortcut activation (NO in step S1502), the processing proceeds to step S612.

As described above, the main control unit 201 determines whether the inquiry is based on an address input by the user or a shortcut activation. When the inquiry is determined to be based on neither an address input by the user or a shortcut activation, the main control unit 201 does not perform the comparison processing. This processing reduces the comparison processing for each plug-in unit, which leads to improvement of the performance.

A fourth exemplary embodiment will be described below.

For example, depending on the manner in which the user uses the information processing apparatus 101, there may be a situation where the address registered in the registered library is in the IP-address-based notation format, and the address input to the address bar 306 is in the name-based notation format (a domain name and a host name). The following describes a method for identifying a library even in the situation according to the present exemplary embodiment.

In the present exemplary embodiment, components identical to those in the first exemplary embodiment are assigned the same reference numeral, and redundant descriptions thereof will not be repeated.

[Resource Identification Processing Flow]

Figure 16:
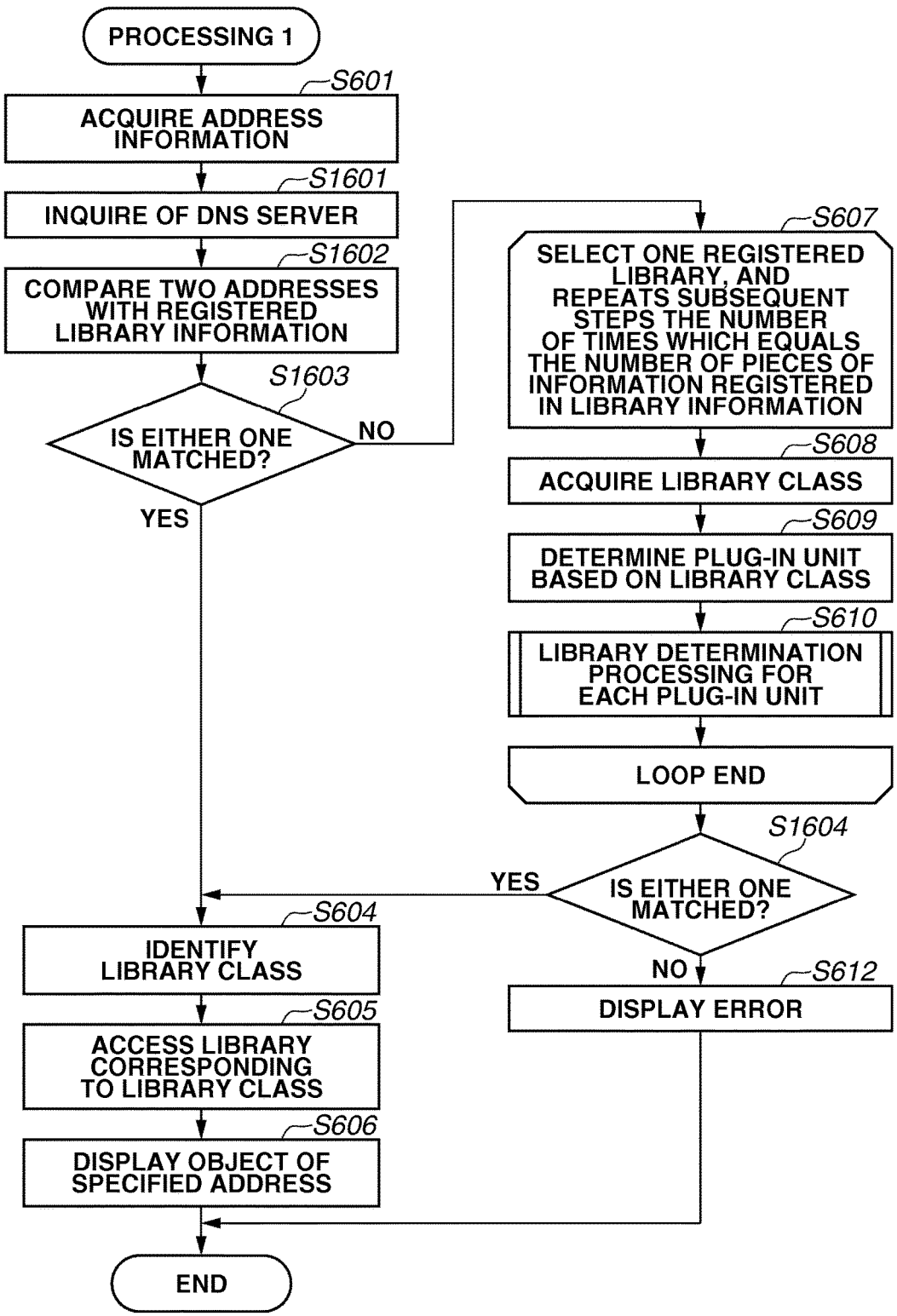
FIG. 16 is a flowchart illustrating an example of processing for inquiring of a Domain Name System (DNS) an input address.

The following describes resource identification processing in detail with reference to FIG. 16.

In step S1601, the main control unit 201 inquires of the DNS server 110 the address input to the address bar 306.

In step S1602, the main control unit 201 compares the two addresses (the address input to the address bar 306 and the address acquired as a result of inquiring of the DNS server 110 in step S1601) with the address included in the registered library information, on a substring comparison basis.

In step S1603, the main control unit 201 determines whether at least one of the two addresses coincides with the address in the registered library information. When at least one of the two addresses is determined to coincide with the address in the registered library information (YES in step S1603), the processing proceeds to step S604. Otherwise, when at least one of the two addresses is determined not to coincide with the address in the registered library information (NO in step S1603), the processing proceeds to step S607.

In step S1604, the main control unit 201 determines the result of the comparison in step S610.

In the processing illustrated in FIG. 16, the main control unit 201 determines whether at least one of the two addresses in the address comparison processing in step S703 in FIG. 7 and in step S805 in FIG. 8 coincides with the address acquired as a result of inquiring of the DNS server 110 in steps S702 or S804.

The main control unit 201 may inquire of the DNS server 110 the address input to the address bar 306 at any timing before the comparison. For example, instead of the timing in step S1601, the main control unit 201 may inquire at the same timing as the timing in step S702 illustrated in FIG. 7 and the timing in step S804 illustrated in FIG. 8.

Other exemplary embodiments will be described below.

The exemplary embodiments can also be achieved by performing the following processing. Specifically, software (a program) for achieving the functions of the above-described exemplary embodiments is supplied to a system or an apparatus via a network or various types of storage media, and a computer (or a CPU or a microprocessor unit (MPU)) of the system or the apparatus reads the program and executes it.

The configuration of the above-described exemplary embodiments makes it easier to utilize the information processing apparatus 101.

According to the exemplary embodiments, a user can easily identify a communication method.

Additional embodiments can also be realized by a computer of a system or apparatus that reads out and executes computer executable instructions recorded on a storage medium (e.g. computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-250180 filed Nov. 14, 2012 and No. 2012-270699 filed Dec. 11, 2012, which are hereby incorporated by reference herein in their entirety.

What is claimed is:

1. An apparatus comprising:
   an application that is installed in the apparatus and includes a plurality of modules capable of communicating with an external information processing apparatus;
   a memory; and
   a processor in communication with the memory, the processor being configured to perform operations comprising:
   acquiring an Internet Protocol (IP) address by inquiring of a Domain Name System (DNS) server about a name-based notation address for one of the plurality of modules to access the external information processing apparatus;
   registering, by the one of the plurality of modules capable of communicating with the external information processing apparatus, the name-based notation address, the IP address, and identification information for identifying the one module in association with the one module;
   receiving from a user an address of the external information processing apparatus as a communication destination; and
   determining whether the received address is registered,
   wherein, in a case where it is determined that the received address is registered, the one module is identified using information registered in association with the received address, and communication with the external information processing apparatus is performed using the identified one module.

2. The apparatus according to claim 1, wherein the processor is configured to further perform operations comprising:
   acquiring, in a case where the received address is a second name-based notation address, a second IP address by inquiring of the DNS server the second name-based notation address; and
   determining whether either the received second name-based notation address or the second IP address is included in a list, and
   identifying the one module based on the determination and communicating with the external information processing apparatus using the identified one module.

3. The apparatus according to claim 1, wherein the processor is configured to further perform operations comprising:
   acquiring a second IP address by inquiring of the DNS server a second name-based notation address of a second external information processing apparatus;
   registering the name-based notation address and the IP address of the external information processing apparatus as a first list and registering the second name-based notation address and the second IP address of the second external information processing apparatus as a second list;
   determining whether the received address is included in the first list or the second list; and
   performing communication using a first module in a case where, as a result of the determination, the received address is included in the first list, and performing communication using a second module in a case where, as a result of the determination, the received address is included in the second list.

4. The apparatus according to claim 1, wherein the processor is configured to further perform, acquiring, in a case where the received address is assigned to a network, a network resource name of the received address, and acquiring the IP address by inquiring of the DNS server using the acquired network resource name.

5. The apparatus according to claim 1, wherein the processor is configured to further perform operations comprising:
   updating, in a case where the IP address is acquired, registered library information including a list; and
   determining whether the received address is included in the list based on the registered library information.

6. The apparatus according to claim 1, wherein the name-based notation address is represented by a domain name or a host name.

7. A method performed by a processor in an apparatus comprising:
   installing, in the apparatus, a plurality of modules capable of communicating with an external information processing apparatus;
   acquiring an Internet Protocol (IP) address by inquiring of a Domain Name System (DNS) server about a name-based notation address for one of the plurality of modules to access the external information processing apparatus;
   registering, by the one of the plurality of modules capable of communicating with the external information processing apparatus, the name-based notation address, the IP address, and identification information for identifying the one module in association with the one module;
   receiving from a user an address of the external information processing apparatus as a communication destination; and
   determining whether the received address is registered,
   wherein, in a case where it is determined that the received address is registered, the one module is identified using information registered in association with the received address, and communication with the external information processing apparatus is performed using the identified one module.

8. The method according to claim 7, wherein the processor is configured to further perform operations comprising:
   acquiring, in a case where the received address is a second name-based notation address, a second IP address by inquiring of the DNS server the second name-based notation address; and
   determining whether either the received second name-based notation address or the second IP address is included in a list, and
   identifying the one module based on the determination and communicating with the external information processing apparatus using the identified one module.

9. The method according to claim 7, wherein the processor is configured to further perform operations comprising:
   acquiring a second IP address by inquiring of the DNS server a second name-based notation address of a second external information processing apparatus;
   registering the name-based notation address and the IP address of the external information processing apparatus as a first list and registering the second name-based notation address and the second IP address of the second external information processing apparatus as a second list;
   determining whether the received address is included in the first list or the second list; and
   performing communication using a first module in a case where, as a result of the determination, the received address is included in the first list, and performing communication using a second module in a case where, as a result of the determination, the received address is included in the second list.

10. The method according to claim 7, further comprising, acquiring, in a case where the received address is assigned to a network, a network resource name of the received address, and acquiring the IP address by inquiring of the DNS server using the acquired network resource name.

11. The method according to claim 7, wherein the processor is configured to further perform operations comprising:
updating, in a case where the IP address is acquired, registered library information including a list; and
determining whether the received address is included in the list based on the registered library information.

12. The method according to claim 7, wherein the name-based notation address is represented by a domain name or a host name.

13. A non-transitory storage medium storing a computer-executable program of instructions for causing a computer to perform a method comprising:
installing, in an apparatus, a plurality of modules capable of communicating with an external information processing apparatus;
acquiring an Internet Protocol (IP) address by inquiring of a Domain Name System (DNS) server about a name-based notation address for one of the plurality of modules to access the external information processing apparatus;
registering, by the one of the plurality of modules capable of communicating with the external information processing apparatus, the name-based notation address, the IP address, and identification information for identifying the one module in association with the one module;
receiving from a user an address of the external information processing apparatus as a communication destination; and
determining whether the received address is registered,
wherein, in a case where it is determined that the received address is registered, the one module is identified using information registered in association with the received address, and communication with the external information processing apparatus is performed using the identified one module.

14. The non-transitory storage medium according to claim 13, wherein the computer-executable program of the instructions for causing the computer to perform the method further comprising:
acquiring, in a case where the received address is a second name-based notation address, a second IP address by inquiring of the DNS server the second name-based notation address; and
determining whether either the received second name-based notation address or the second IP address is included in a list, and
identifying the one module based on the determination and communicating with the external information processing apparatus using the identified one module.

15. The non-transitory storage medium according to claim 13, wherein the computer-executable program of the instructions for causing the computer to perform the method further comprising:
acquiring a second IP address by inquiring of the DNS server a second name-based notation address of a second external information processing apparatus;
registering the name-based notation address and the IP address of the external information processing apparatus as a first list and registering the second name-based notation address and the second IP address of the second external information processing apparatus as a second list;
determining whether the received address is included in the first list or the second list; and
performing communication using a first module in a case where, as a result of the determination, the received address is included in the first list, and performing communication using a second module in a case where, as a result of the determination, the received address is included in the second list.

16. The non-transitory storage medium according to claim 13, further comprising, acquiring, in a case where the received address is assigned to a network, a network resource name of the received address, and acquiring the IP address by inquiring of the DNS server using the acquired network resource name.

17. The non-transitory storage medium according to claim 13, wherein the computer-executable program of the instructions for causing the computer to perform the method further comprising:
updating, in a case where the IP address is acquired, registered library information including a list; and
determining whether the received address is included in the list based on the registered library information.

18. The non-transitory storage medium according to claim 13, wherein the name-based notation address is represented by a domain name or a host name.

* * * * *